June 21, 1949.   C. E. WENCK   2,474,176
HOOK AND LINE HOLDER
Filed July 21, 1947
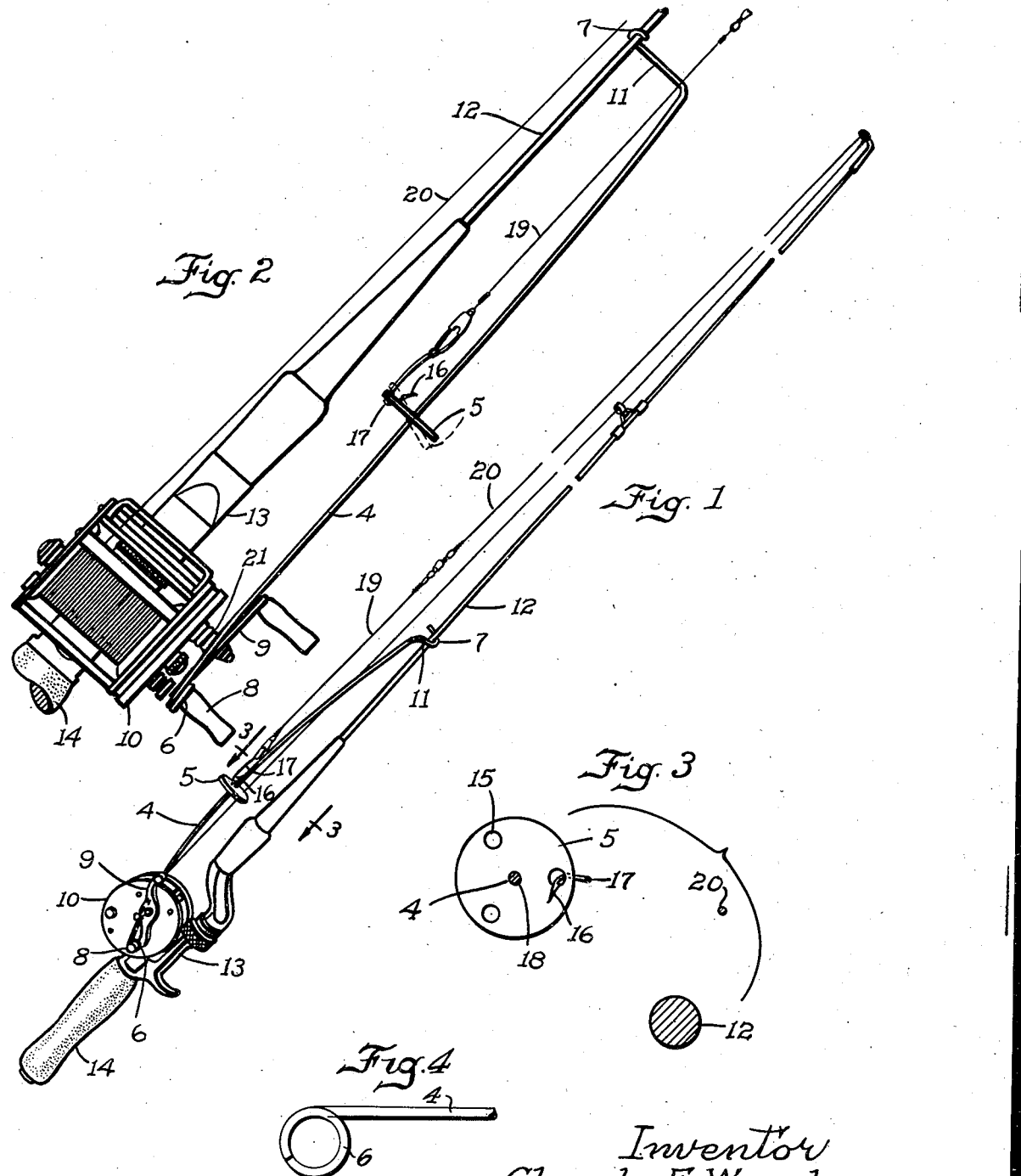
Inventor
Claude E. Wenck Patented June 21, 1949

2,474,176

UNITED STATES PATENT OFFICE 2,474,176

HOOK AND LINE HOLDER

Claude E. Wenck, Rockford, Ill.

Application July 21, 1947, Serial No. 762,304

9 Claims. (Cl. 43—33)

This invention relates to a new and improved hook and line holder for casting rods.

The principal object of my invention is to provide a simple and inexpensive spring wire clip with hook holding disk sliding thereon, which may be carried conveniently by the fisherman in his pocket or tackle box and quickly and easily applied to the casting rod for use and as quickly and easily removed later, and which, when properly applied, serves to hold the hook securely and at the same time keep the line under tension.

One of the novel features of the spring wire clip is the fact that it is quickly attachable at one end to one of the knobs on the crank of the reel, and is quickly attachable at the other end by means of a hook to the rod, and rests on the crank bearing near the first end, so that a slight backing up of the crank will serve to arch the clip and place it under sufficient spring tension to insure its holding onto the rod and reel securely.

Another novel feature is the provision of a hook holding slider in the form of a disk, to which the hook attaches on the peripheral portion, the disk having a center hole to receive the spring wire of the clip with a close working fit, so that when the hook has been applied to the disk and the disk is slid rearwardly to take up slack in the line and place it under tension, there will be no likelihood of the disk slipping back, because of the tendency of the disk to be pulled to a slightly askew position under tension of the line, thereby preventing its slipping.

The invention is illustrated in the accompanying drawing, in which—

Fig. 1 is a side view of a casting rod having a hook and line holder made in accordance with my invention applied thereto;

Fig. 2 is a plan view of the holder end of the rod on a larger scale, so as better to illustrate the construction of the device of my invention;

Fig. 3 is a cross-section on the line 3—3 of Fig. 1 on a still larger scale, indicating the space relationship of the rod, the line, the hook, and the hook holding slider carried on the spring wire clip, and Fig. 4 is a side view of one end of the spring wire clip shown on a larger scale, this being the end that fits over the knob on the crank of the reel.

The same reference numerals are applied to corresponding parts throughout the views.

The reference numeral 4 designates the spring wire clip, and 5 the hook holding slider thereon. The spring wire clip 4 has a loop 6 formed on one end and a hook 7 on the other end, the loop 6 being large enough to slip over either one of the knobs 8 on the crank 9 of the reel 10, and the hook 7 being provided on the end portion 11 of the spring wire clip that is bent substantially at right angles to the rest of the wire, as clearly appears in Fig. 2, the hook being large enough to attach easily to the rod 12. The casting rod shown is of a conventional type, having an offset portion 13 next to the handle 14, on which the reel 10 is adapted to be mounted in the usual way. The slider 5 is in the form of a disk, which is preferably, though not necessarily, made of aluminum having preferably a number of circumferentially spaced holes 15 therein in the peripheral portion, in any one of which the barb end 16 of a fish hook 17 may be entered. There is also a center hole 18 in the disk, in which the spring wire of the clip 4 has a close working fit. Now, of course, the disk 5 could be made of sheet metal, such as brass, and, if desired, the disk could be cupped with the peripheral flange projecting rearwardly and designed to engage at its edge in the bail portion of the hook, leaving the sharp end of the barb 16 clear of contact with any of the metal of the disk, so as to avoid dulling, or, if desired, the metal disk could be perforated, like the disk 5, to accommodate the barbed end of the hook.

In operation, the hook 17, which is carried on the end of the usual leader 19 attached to the line 20, has the barb inserted in any one of the holes 15 in the aluminum disk 5, to hold it securely and thus avoid entanglement in the fisherman's clothes or person or on other persons and objects in passing. The fisherman when he is about to apply the device to the rod, first of all reels in enough of the line 20 to position the hook 17 approximately in the middle of the zone of the clip 4 and until the reel crank 9 is in a position about parallel with the rod. He then slips the looped end 6 of the spring wire clip 4 over one of the knobs 8 on the crank 9 and rests the clip on top of the bearing 21 on the reel 10 and applies the hooked end 7 of the clip 4 to the rod 12. Then he turns back the crank 9 about an eighth of a turn, just enough to arch the clip 4 to the extent illustrated, placing it under sufficient spring tension to insure its taking hold of the rod securely. Then the hook 17 is attached to the disk 5, and the disk is slid rearwardly to take up slack in the line 20 and place the line under a desired tension, which will result in a slight deflection of the outer slender end of the rod 12, as indicated in Fig. 1. The fact that the pull on the disk 5 is radially outwardly from the central bearing hole 18 reduces likelihood of the disk 5 slipping back after it has been properly adjusted by the fisherman, because the disk is held slightly askew in relation to its normal plane relative to the wire 4, as indicated in dotted lines in Fig. 2, thus setting up a bind to prevent slippage. The disk 5 is then revolved until the hook 16 lies horizontally between rod 12 and clip 4, as clearly appears in Fig.

2. It is unnecessary to make any close adjustment of the crank 9 at the outset, because the clip 4 is provided of a length approximately equivalent to the length of line 20 taken in or paid out by reel 10 in a half-turn of crank 9. Hence, slider 5 will always have enough room for adjustment, first in one direction for attachment of hook 17 and then in the other direction for tensioning of the line 20.

It is believed the foregoing description conveys a good understanding of the objects and advantages of my invention. The appended claims have been drawn to cover all legitimate modifications and adaptations.

I claim:

1. A fishing rod attachment comprising the combination with a fishing rod having a fish line and fish hook in connection therewith, of an elongated flexible resilient support adapted to be attached to said rod, means for detachably securing the ends of said support to said rod holding the support thereon in an arched tensioned condition, and a fish hook holder adapted to be attached to the hook and adjustable along said support to a position where it holds the line taut.

2. A fishing rod attachment comprising the combination with a fishing rod having a fish line and fish hook in connection therewith, and a reel for winding up said line including a hand crank equipped with a knob, of an elongated support having means on one end adapted to receive said rod and means on the other end adapted to receive said knob, whereby said support is adapted to be mounted on said rod and reel, and a fish hook holder adapted to be attached to the hook and adjustable along said support to a position where it holds the line taut.

3. A fishing rod attachment comprising the combination with a fishing rod having a fish line and fish hook in connection therewith, and a reel for winding up said line including a hand crank equipped with a knob, of an elongated support having means on one end adapted to receive said rod and means on the other end adapted to receive said knob, whereby said support is adapted to be mounted on said rod and reel, said support being formed from a length of spring wire and being adapted to be supported intermediate its ends on a portion of said reel so that the wire may be arched relative to said reel by rotary movement of the knob attached to the adjacent end of the wire, and a perforated slider receiving said wire in its perforation with a close working fit and adapted to be attached to the hook and slid along said wire to a position where it holds the line taut.

4. In a fishing rod appliance, an elongated spring wire clip having a loop formed on one end and a hook formed on the other end, the loop being of a diameter to receive a knob on the crank of a reel on a rod, and the hook being of a size to receive the rod, whereby the clip is adapted to be attached to a rod and to the crank knob of a reel thereon, and a disc having a center hole closely receiving said wire clip for slidable support of the disc thereon and having an opening near its periphery adapted to receive the barb portion of a fish hook on a line connected to the reel on said rod.

5. In a fishing rod appliance, an elongated spring wire clip having a loop formed on one end and a hook formed on the other end, the loop being of a diameter to receive a knob on the crank of a reel on a rod, and the hook being of a size to receive the rod, whereby the clip is adapted to be attached to a rod and to the crank knob of a reel thereon, and a disc having a center hole closely receiving said wire clip for slidable support of the disc thereon, and having a peripheral portion formed to receive the bail of a fish hook on a line connected to the reel on said rod.

6. In a fishing rod appliance, an elongated spring wire clip having a loop formed on one end and a hook formed on the other end, the loop being of a diameter to receive a knob on the crank of a reel on a rod, and the hook being of a size to receive the rod, whereby the clip is adapted to be attached to a rod and to the crank knob of a reel thereon, the wire being of cylindrical form, and a disc having a circular center hole closely and rotatably receiving said wire clip for slidable support of said disc thereon, said disc having a plurality of openings provided therein near the periphery for selectively receiving the barb portion of a fish hook on a line connected to the reel on said rod.

7. In a fishing rod appliance, an elongated spring wire clip having a loop formed on one end and a hook formed on the other end, the loop being of a diameter to receive a knob on the crank of a reel on a rod, and the hook being of a size to receive the rod, whereby the clip is adapted to be attached to a rod and to the crank knob of a reel thereon, the wire being of a cylindrical form, and a disc having a circular center hole closely and rotatably receiving said wire clip for slidable support of said disc thereon, said disc having the peripheral portion formed to receive in any one of a plurality of selected positions the bail of a fish hook on a line connected to the reel on said rod.

8. In combination, a fishing rod having a reel mounted on the handle end, the reel including a hank crank rotatable relative to a projecting bearing boss provided on one side of the reel, there being a fish line extending from the reel along said rod and equipped with a fish hook on the outer end, and a hook and line holder attached to the rod and reel comprising a spring wire clip formed for attachment at one end on said crank and to rest on said bearing boss and having the other end bent laterally and formed for attachment at the extremity to the rod, and a fish hook holder adapted to be attached to the hook and adjustable along said wire clip to a position where it holds the line taut.

9. A fishing rod attachment comprising the combination with a fishing rod having a fish line and fish hook in connection therewith, of an elongated spring wire clip adapted to be attached to said rod, means for detachably securing the ends of said wire clip to said rod holding the clip thereon in an arched tensioned condition, and a perforated slider receiving the wire of said clip in its perforation with a close working fit and adapted to be attached to the hook and to be adjusted along said wire to a position where it holds the line taut.

CLAUDE E. WENCK.

REFERENCES CITED

The following references are of record in the file of this patent:

UNITED STATES PATENTS

| Number | Name | Date |
| --- | --- | --- |
| 1,531,725 | Baker | Mar. 31, 1925 |